United States Patent
Cinquin et al.

(10) Patent No.: US 6,796,918 B1
(45) Date of Patent: Sep. 28, 2004

(54) PNEUMATIC DISPLACEMENT SYSTEM

(75) Inventors: Philippe Cinquin, La Tronche (FR); Jocelyne Troccaz, Eybens (FR)

(73) Assignee: Universite Joseph Fourier, Grenoble Cedex (FR)

( * ) Notice: Subject to any disclaimer, the term of this patent is extended or adjusted under 35 U.S.C. 154(b) by 122 days.

(21) Appl. No.: 10/031,052

(22) PCT Filed: Jul. 13, 2000

(86) PCT No.: PCT/FR00/02041

§ 371 (c)(1),
(2), (4) Date: Jun. 5, 2002

(87) PCT Pub. No.: WO01/06132

PCT Pub. Date: Jan. 25, 2001

(30) Foreign Application Priority Data

Jul. 15, 1999 (FR) .......................... 99 09362

(51) Int. Cl.⁷ ................................. F16H 7/00
(52) U.S. Cl. ................... 474/148; 92/92; 198/832.1
(58) Field of Search ............. 474/148, 74; 600/587; 623/14; 92/92; 198/750.7, 832.1; 74/501.5 R, 500.5

(56) References Cited

U.S. PATENT DOCUMENTS

| | | | |
|---|---|---|---|
| 4,664,232 A | 5/1987 | Takagi et al. | 188/74 |
| 5,222,428 A | 6/1993 | Janetzko et al. | 92/28 |
| 5,860,333 A | 1/1999 | Feng | 74/813 |

FOREIGN PATENT DOCUMENTS

| | | |
|---|---|---|
| EP | 0647786 | 4/1995 |
| FR | 2560102 | 8/1985 |

OTHER PUBLICATIONS

Japanese Patent Abstracts, vol. 014, No. 355 (M–1004), Jul. 31, 1990 & JP 02 125102 A (Olympus Optical), May 14, 1990.

Tondu B. et al. "Theorie D'Un Muscle Artificiel Pneumatique et Application a la Modelisation du Muscle Artificiel de McKibben Theory of an Artificial Pneumatic Muscle and Application to the Modelling of McKibben Artificial Muscle", Comptes Rendus de l Academie des Sciences: Serie II: Mecanique–Physique–Chimie–Astronomie, FR, Editions Scientifiques & Medicates Elsevier, vol. 320, No. 3, Feb. 2, 1995, pp. 105–114, XP000497922, ISSN: 1251–8069.

*Primary Examiner*—David A. Bucci
*Assistant Examiner*—Vicky A. Johnson
(74) *Attorney, Agent, or Firm*—Duane Morris LLP

(57) ABSTRACT

The invention concerns a pneumatic system for displacing a cable (1) stretched in a loop between at least two pulleys (2, 3). Said system comprises at least an artificial muscle (5) inserted over a portion of the loop, the length of said artificial muscle varying depending on whether or not it is under pressure, means for pressurizing or not the artificial muscle, and means for alternately blocking two of said pulleys in a least one rotating direction.

14 Claims, 2 Drawing Sheets

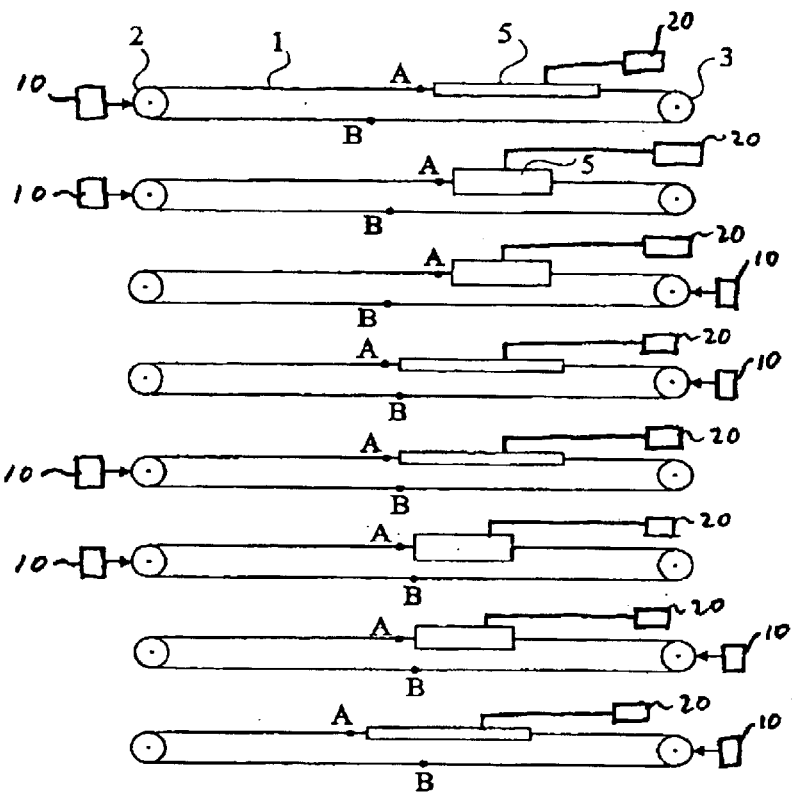
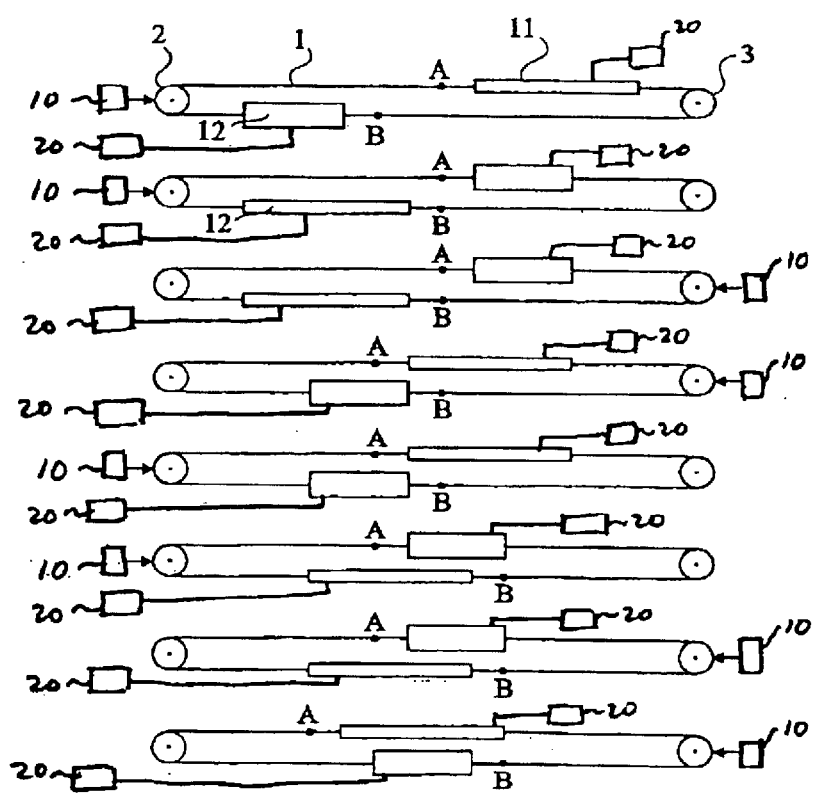

PNEUMATIC DISPLACEMENT SYSTEM

The present invention relates to a pneumatic displacement system.

Pneumatic drive systems, currently called "artificial muscles", are known, which are formed of inflatable tubes inserted in protection braids, such that the artificial muscle contracts or expands according to whether its internal fluid pressure increases or decreases. Such artificial muscles are, for example, described by B. Tondu and P. Lopez in "Compte rendu de l'Académie des Sciences", t. 320, pp. 105–114, 1995. In particular, such "muscles" have been designed, which can have a length on the order of some ten centimeters and a diameter on the order of from 1 to 3 cm and which provide a contraction of the order of from 10 to 20% of their length when their internal pressure varies from the atmospheric pressure to a pressure which is 4 to 5 times greater. Such systems have the advantage of exhibiting an excellent power-to-weight ratio. For example, an artificial muscle having a weight on the order of from 50 to 100 grams can exert a force on the order of 1,000 newtons, that is, for example, lift a load on the order of 100 kg. Such drive systems are well adapted to an operation in hospital surroundings since they are clean, non polluting, and lend themselves to disinfection/sterilization operations. Further, they only use low-power and low-voltage electricity sources to control electrovalves. Further, compressed air sources are currently available in hospitals.

However, such systems have a disadvantage linked to their small movement which, as indicated, is on the order of 10 to 20% only between their idle position and their active position.

The present invention aims at providing a pneumatic displacement system exhibiting the same lightness, reliability, and security advantages as the above-mentioned artificial muscles, but further having a wide movement.

To achieve this object, the present invention provides a system of pneumatic displacement of a cable stretched in a loop between at least two pulleys, including at least one "artificial muscle" inserted on a portion of the loop, the length of this artificial muscle varying according to whether it is or not under pressure, a means 20 for putting or not the artificial muscle under pressure, and means for alternately blocking two of said pulleys in at least one rotation direction.

According to an embodiment of the present invention, the system includes a single artificial muscle arranged on a branch of the loop and a resilient cable.

According to an embodiment of the present invention, the system includes several artificial muscles in series arranged on the same branch of the loop. FIG. 5 illustrates an example of a pneumatic displacement system comprising two artificial muscles in series arranged on the same branch of the loop.

According to an embodiment of the present invention, the system includes at least two artificial muscles respectively located on either side of a pulley, and means for putting under pressure in a complementary manner said artificial muscles at the rate at which the pulleys are blocked and unblocked. The cable is resilient.

According to an embodiment of the present invention, a device to be moved is directly linked to the cable as illustrated in FIG. 3.

According to an embodiment of the present invention, a device to be moved is linked to the cable via a pulley transmission system.

According to an embodiment of the present invention, at least one of the pulleys is linked to a fixed point via a resilient means.

The foregoing objects, features and advantages of the present invention, will be discussed in detail in the following non-limiting description of specific embodiments in connection with the accompanying drawings, wherein:

FIGS. 1A to 1H show successive phases of operation of a device according to a first embodiment of the present invention;

FIGS. 2A to 2H show successive phases of operation of a device according to a second embodiment of the present invention.

Figure 3:
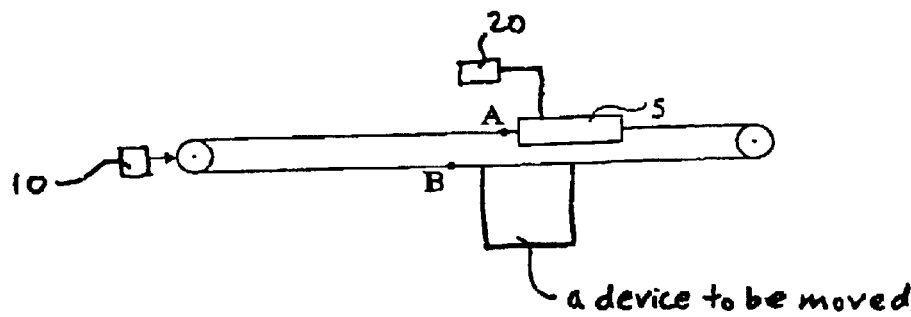
FIGS. 3 to 6 are schematic illustrations of various other aspects of the present invention.

FIG. 1A very schematically shows a first embodiment of a pneumatic displacement system according to the present invention. This system includes a cable, wire, strip, or strap stretched in a closed loop between two pulleys 2 and 3. Each of the pulleys is associated with a remotely controllable blocking system 10, for example, a pneumatic brake or a spring ratchet wheel with a removable locking ratchet, the ratchet being controllable by pneumatic means or by a solenoid. In the loop formed by cable 1 is inserted an artificial muscle 5 such as previously defined. It should be noted that it may be a one-way or two-way blocking system. In FIG. 1A, this muscle is shown in expanded position, which corresponds, for example, to its state under low pressure. Reference A has been used to indicate a point close to an end of artificial muscle 5 and reference B has been used to indicate a point located on the other loop branch. The fact that pulley 2 is blocked (or only allows counterclockwise rotations) has been represented by an arrow. It is also assumed that cable 1 has a certain resistance. Thus, in the state shown in FIG. 1. this cable exhibits a first tension.

FIG. 1B shows the same structure, with pulley 2 being still blocked and pulley 3 still free, but artificial muscle 5 being contracted. The cable tension increases towards a second tension value. Point A moves to the right and point B also moves to the right.

At the step of FIG. 1C, the muscle is maintained in the contracted state, but this time, pulley 3 is blocked and pulley 2 is free. Nothing changes in the motion of the various cable points, which remains in the second tension state.

At the step of FIG. 1D, pulley 3 still being blocked, the artificial muscle is expanded: point A moves to the left and point B moves to the right.

At the steps of FIGS. 1E and 1F, pulley 2 is blocked and pulley 3 is free. At the step of FIG. 1E, nothing has been modified. At the step of FIG. 1F, the artificial muscle has been contracted. Point A has moved to the right, and so has point B.

At the steps of FIGS. 1G and 1H, pulley 3 is blocked and pulley 2 is freed. In FIG. 1G, nothing has been modified. In FIG. 1H, the artificial muscle has expanded, point A has moved to the left and point B has moved to the right.

It can thus be seen that by alternating the blocking of pulleys 2 and 3 and by causing at the same rate contractions and expansions of the artificial muscle, the loop points turn counterclockwise. Point B regularly rotates while point A moves forwards and backwards, the forward motions being more significant than the backward motions. Of course, the rotation direction could be inverted to pass from an expanded state to a contracted state while pulley 3, rather than pulley 2, is blocked.

Considering that an element linked to point B is desired to be displaced, the displacement speed of this element may be modified by modifying the frequency of the switchings between the blocked and free states of the two pulleys, correlatively the frequency of the expanded/contracted switchings of muscle 5. For a given artificial muscle, the amplitude of the incremental displacements may be modified by modifying the difference between the maximum and minimum pressures provided to obtain the contracted and expanded states. Several artificial muscles may also be arranged in series on a same strip.

The system may have a continuous operation, providing that artificial muscle 5 can, like cable 1, turn around each of the pulleys. In this last case, it will be preferred to use systems with at least two artificial muscles in series, a single muscle being switched at a given time, and the muscle turning around a pulley being inhibited while it is around said pulley.

A system according to the present invention easily lends itself to a control at a frequency on the order of 10 counts per second, which corresponds, if the possible movement of each muscle is on the order of 2 cm, at a 20-cm/s speed. This speed is perfectly compatible with a great number of applications, especially with remote-handling type applications. It may also be provided to use a common pneumatic supply for the inflating/deflating of the artificial muscles and for the pulley stop/blocking control. Electrovalves may be provided to be connected to the various elements, the electrovalves being possibly driven by a computer.

FIG. 2A shows a second embodiment of the present invention in a first state. A cable 1 is present between pulleys 2 and 3 which can alternately be blocked (bidirectional blocking). Two artificial muscles 11 and 12 are arranged on the opposite branches of the loop. The two muscles are expanded and contracted in opposition. For example, muscle 11 is expanded when pulley 2 is blocked and muscle 12 is expanded when pulley 3 is blocked. In the phase between FIGS. 2A and 2B, pulley 2 is blocked, muscle 11 is contracted and muscle 12 is expanded. In this phase, the cable portion between the blocked pulley and each of the artificial muscles remains motionless (point A) and the cable portion between the free pulley and each of the artificial muscles (point B) moves counterclockwise. In this embodiment, the system operation does not require for the cable to be resilient, although a slightly resilient cable may be chosen for other reasons.

In the phase between the states shown in FIGS. 2C and 2D, point A moves counterclockwise while point B remains fixed. Successive displacement phases are illustrated in FIGS. 2E to 2H. It can be seen that, conversely to the case of the first embodiment, there are no phases in which a given point of the cable moves backwards. Each of the points either moves forwards or remains fixed at each step. This may be an advantage in many applications.

The various alternatives described in relation with FIG. 1 will also apply to the embodiment of FIG. 2 as concerns the ways of modifying the cable rotating speed, of modifying the amplitude of the elementary increments, and of multiplying or not the number of elements. Further, in the system of FIG. 2, in which artificial muscles operate in opposition, power conservation means partially using the power stored in an inflated muscle to take part in the inflating of a deflated muscle while the first muscle must deflate, may be provided. It may also be provided for one of the muscles to vary between two high pressures, for example five times and four times the atmospheric pressure, while another one varies between two intermediary pressures, for example, twice and once the atmospheric pressure. This may facilitate power transfers from one muscle to the other.

The present invention may be applied to many systems in which a mechanical displacement is desired to be implemented. The element to be moved must be directly or indirectly linked to cable 1 of the first or second embodiment of the present invention.

According to an alternative of the present invention, additional pulleys may be added to modify the cable path and the path of the element to be displaced or to facilitate this path.

According to an advantage of the present invention, in the case where cable 1 is resilient, the system enables limiting the maximum constraint which can be applied to the driven element, which provides an often desirable security function in medical applications.

Figure 4:
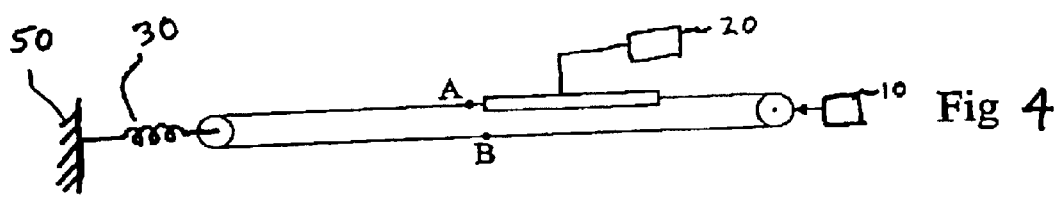
Figure 5:
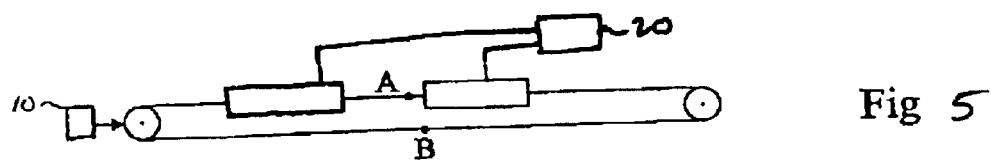
Figure 6:
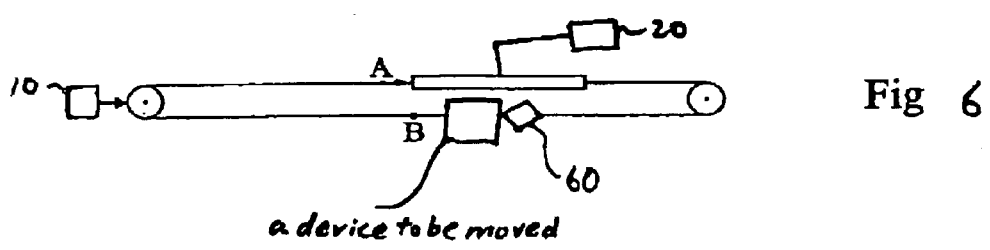

The end pulleys may also be provided, instead of being assembled on fixed points, to be assembled on these points 50 via resilient elements 30 such as springs, as illustrated in FIG. 4. Otherwise, the element linked to the rotating cable may be provided to be associated to this cable via a transmission pulley system 60 which ensures the desired resilience, as illustrated in FIG. 6.

What is claimed is:

1. A system of pneumatic displacement of a cable (1) stretched in a loop between at least two pulleys (2, 3), wherein said system comprising:

at least one "artificial muscle" (5, 11, 12) inserted on a portion of the loop, the length of this artificial muscle varying according to whether it is or not under pressure, a means for putting or not the artificial muscle under pressure, and means for alternately blocking two of said pulleys in at least one rotation direction.

2. The system of claim 1, wherein said system comprises a single artificial muscle (5) arranged on a branch of the loop and a resilient cable.

3. The system of claim 2, wherein at least one of the pulleys is linked to a fixed point via a resilient means.

4. The system of claim 2, wherein said system further comprises at least one additional artificial muscle arranged in series with the single artificial muscle on the same branch of the loop.

5. The system of claim 4, wherein at least one of the pulleys is linked to a fixed point via a resilient means.

6. The system of claim 1, wherein said system comprises at least two artificial muscles (11, 12) respectively located on either side of a pulley, and means for putting under pressure in a complementary manner said artificial muscles at the rate at which the pulleys are blocked and unblocked.

7. The system of claim 6, wherein at least one of the pulleys is linked to a fixed point via a resilient means.

8. The system of claim 6, wherein the cable is resilient.

9. The system of claim 8, wherein at least one of the pulleys is linked to a fixed point via a resilient means.

10. The system of claim 1, wherein a device to be moved is directly linked to the cable.

11. The system of claim 10, wherein at least one of the pulleys is linked to a fixed point via a resilient means.

12. The system of claim 1, wherein a device to be moved is linked to the cable via a pulley transmission system.

13. The system of claim 12, wherein at least one of the pulleys is linked to a fixed point via a resilient means.

14. The system of any of claim 1, wherein at least one of the pulleys is linked to a fixed point via a resilient means.

* * * * *